Jan. 19, 1932.  W. J. ANDRES  1,841,696
HYDRAULIC BRAKE
Filed Oct. 12, 1925

INVENTOR
WILLIAM J. ANDRES
BY
M. W. McConkey
ATTORNEY

Patented Jan. 19, 1932

1,841,696

UNITED STATES PATENT OFFICE

WILLIAM JOSEPH ANDRES, OF SOUTH BEND, INDIANA, ASSIGNOR TO BENDIX BRAKE COMPANY, OF SOUTH BEND, INDIANA, A CORPORATION OF ILLINOIS

HYDRAULIC BRAKE

Application filed October 12, 1925. Serial No. 61,992.

This invention relates to brakes, and is illustrated as embodied in an automobile chassis having a set of hydraulic brakes. An object of the invention is to operate the brake-applying piston yieldingly, preferably by a telescoping connecting rod having a spring resisting telescoping of the parts. Another feature of the invention relates to the mounting of the cylinder, which has its open end secured firmly against a cross member of the chassis frame, or an equivalent support, with the connecting rod passing through the cross member into the open end of the cylinder and connected to the piston.

Figure 1:
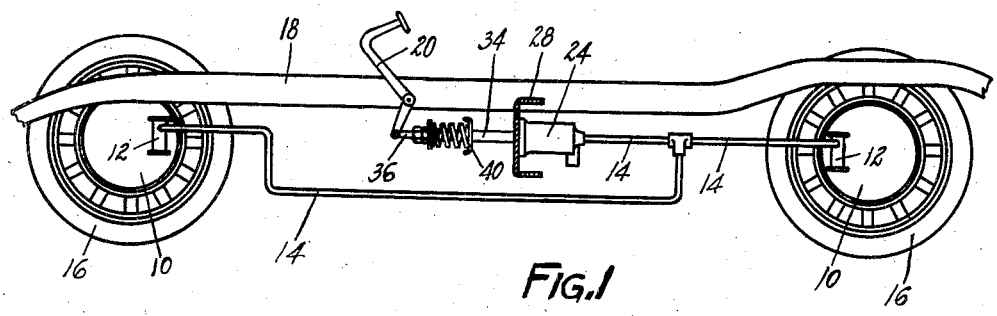
Figure 2:
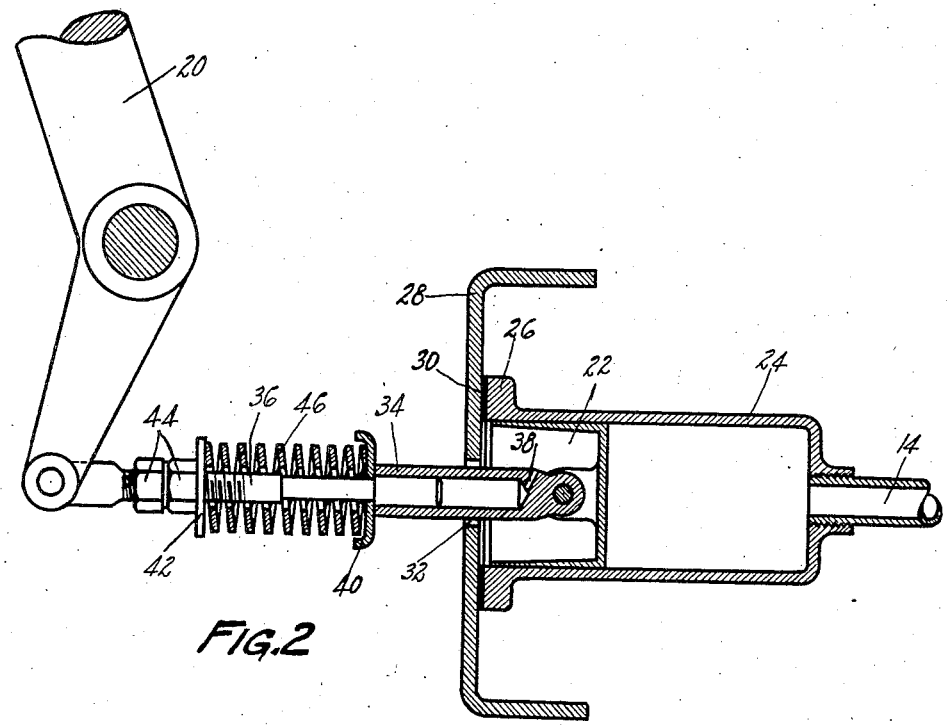

These and other novel and desirable features of the invention will be apparent from the following description of one illustrative embodiment shown in the accompanying drawings, in which:

Figure 1 is a diagrammatic longitudinal section through an automobile chassis, showing the relative arrangement of the parts; and Figure 2 is a vertical longitudinal section through the brake-operating cylinder and piston and the connecting rod.

The novel operating means is intended to apply brakes 10 having brake-applying cylinders and pistons 12 operated by oil or the like in conduits 14. The brakes are illustrated as acting directly on the road wheels 16, which support by the usual springs a chassis frame 18.

The brakes may be controlled by a lever or pedal 20 operating a piston 22 in a master cylinder 24 having an outlet communicating with the conduits 14. At its open end, the cylinder 24 has a flange 26 bolted or otherwise secured against the rear face of a cross member 28 of frame 18, or other suitable support, a gasket 30 being interposed if desired.

Between pedal 20 and piston 22, and extending through an opening 32 in the cross member 28 into the open end of the cylinder 24, is a novel connecting rod in two telescoping parts. In the particular arrangement shown, one of these parts is a sleeve 34 pivoted to piston 22, and the other is a rod 36 having a plunger end freely sliding in sleeve 34, a vent 38 preferably being provided in the sleeve to prevent any "dashpot" action.

A washer or other abutment 40 is provided for sleeve 34, in engagement with its end; and another abutment 42 engages locknuts 44 adjustably threaded on the rod 36. A spring 46, shown as helically wound of flat spring stock, is confined between the two abutments, its tension being adjusted by nuts 44. Thus plunger 22 is yieldingly operated through spring 46 when pedal 20 is depressed. This limits the pressure which can be applied to the brakes, and guards against locking the wheels. It is theoretically possible, with sufficient collapse of the spring 46, for the outer shoulder on the rod 36 to abut the stop 40. This result however is entirely without the scope of the invention, it being intended that the telescoping parts be so proportioned and the spring 46 made sufficiently strong to insure their functioning as described above.

While one illustrative embodiment is described in detail, it is not my intention to limit the scope of the invention to that particular embodiment, or otherwise than by the terms of the appended claim.

I claim:

Hydraulic brake operating mechanism comprising, in combination, a fluid cylinder, a working piston therein, an operating lever, operating connections between the lever and the piston comprising a sleeve pivoted to one of said members, a plunger pivoted to the other member, said plunger telescoped within the sleeve, an abutment slidably positioned upon the plunger adjacent to the end of the sleeve and adapted to engage the same, a second abutment adjustably positioned on the opposite end of the plunger, a spring encircling the plunger between said abutments holding the slidable abutment against the end of the sleeve and through which all working pressure is transmitted from the lever to the piston.

In testimony whereof, I have hereunto signed my name.

WILLIAM JOSEPH ANDRES.